United States Patent [19]

Srivastava

[11] Patent Number: 5,223,920
[45] Date of Patent: Jun. 29, 1993

[54] VIDEO PROCESSOR HAVING AUTOMATIC CHROMINANCE CONTROL COMPENSATION

[75] Inventor: Gopal K. Srivastava, Arlington Heights, Ill.

[73] Assignee: Zenith Electronics Corporation, Glenview, Ill.

[21] Appl. No.: 771,273

[22] Filed: Oct. 3, 1991

[51] Int. Cl.$^5$ .................. H04N 9/77; H04N 9/78
[52] U.S. Cl. ........................ 358/21 R; 358/31; 358/39; 358/40
[58] Field of Search ............ 358/21 R, 39, 31, 38, 358/40

[56] References Cited

U.S. PATENT DOCUMENTS

| | | | |
|---|---|---|---|
| 4,851,898 | 7/1989 | Asahara | 358/31 |
| 4,920,408 | 4/1990 | Umezawa | 358/31 |
| 4,984,069 | 1/1991 | Yamada | 358/31 |

OTHER PUBLICATIONS

Integrated NTSC Chrominance/Luminance Processor, By L. A. Hardwood et al., IEEE Transaction on Consumer Electronics, vol. CE-26, Nov. 1980, pp. 693-706.

*Primary Examiner*—Tommy Chin

[57] ABSTRACT

A television receiver includes a frequency multiplexed video processor which processes chrominance and luminance signals in response to synchronously detected composite video information. The composite video signal is separated into a plurality of frequency spectra which are individually processed utilizing digital electronic circuitry to achieve high performance and cost effectiveness. A comb filter is operative within one of the processors to provide separation of the luminance and chrominance information within the chrominance signal bandpass to maintain high frequency luminance signal components. A separate processor and bandpass filter are operative to provide separate control of the luminance peaking within the system. Conventional luminance and chrominance processing converts the output signals of the multiplexed processor to RGB video signals which are applied to a conventional cathode ray tube display having a conventional deflection system associated therewith.

11 Claims, 5 Drawing Sheets

VIDEO PROCESSOR HAVING AUTOMATIC CHROMINANCE CONTROL COMPENSATION

FIELD OF THE INVENTION

This invention relates generally to television receivers and particularly to the systems therein for processing luminance and chrominance information.

BACKGROUND OF THE INVENTION

Color television systems have been developed using several different broadcast and signal processing formats to achieve the successful transmission and reception of color television programming. While substantial differences between systems exist, they all must satisfy the basic objective of combining the picture or luminance information, the color or chrominance information, and sound information together with appropriate display scan synchronizing signals to form an information signal which may be modulated upon a carrier for transmission. At the receiver, the opposite processes must take place in which the several components of the information signal are separated and appropriately processed. In most television broadcast formats such as the NTSC system used within the United States of America and the PAL system used in many European countries, the signal components corresponding to luminance, chrominance and sound are distinguished from each other and separated for individual processing largely on the basis of signal frequencies. For example, in the NTSC system, the available broadcast bandwidth is maintained at 6 megahertz. To conserve channel bandwidth and to transmit up to 4.1 megahertz of video signal, a vestigial sideband format in which the carrier is off center within the 6 megahertz channel bandwidth is used. The chrominance information is modulated upon a chrominance subcarrier separated from the picture carrier by approximately 3.58 megahertz. The sound information is separated from the picture carrier by 4.5 megahertz. To further conserve channel bandwidth, the luminance signal and chrominance signal share a part of the channel bandwidth.

Thus, a low cost receiver is able to select the chrominance, sound and luminance signal portions by using appropriate frequency response networks or filters and thereafter perform individual processing thereon. Unfortunately, the frequency selection process used in most television receivers results in the loss of substantial amounts of information or image content. Perhaps the most notable loss occurs in the video or luminance information which is severely bandwidth limited as a result of the separation of chrominance and sound information. While these losses have been recognized as less than desirable, the basic filtering processes used in most television receivers has made improvement difficult or impractical. Thus, it was recognized early in television system development that effective recovery of the luminance signal components located in the chrominance frequency band would significantly improve picture resolution. Once device type which facilitates separation of luminance from chrominance within the chrominance frequency band is known generally as a comb filter. However, comb filters generally require long delay networks which often prove to be expensive and inaccurate. For example, many receivers have employed an analog glass delay line type comb filter to separate luminance and chrominance information from the shared frequency spectrum. Since glass delay lines generally do not provide accurate delay, factory alignments are generally needed in such receivers to accurately separate luminance and chrominance signals. This, of course, is time consuming and expensive in high volume television production.

One of the approaches contemplated by practitioners in the art seeking to improve the recovery of luminance information from the chrominance frequency band is found in the use of digital signal processing rather than the more pervasive presently used analog signal processing. In a digital processing environment, the separation of chrominance and luminance information within the chrominance band may be carried forward using digital comb filters which provide accurate and cost effective delay networks and therefore accurately and cost effectively separate the luminance and the chrominance signals within the chrominance band. Effective comb filters are more easily realized in the digital environment and extensive memory may be cost effectively achieved. As a result, comb filtering and signal delays are relatively easy to perform in a digital signal environment. With the availability of cost effective comb filter networks which may recover substantially all of the luminance signal components within the chrominance band, an opportunity arises to use the recovered luminance signal components to significantly improve the displayed picture. However, it has been found that the fact that the chrominance band luminance signals are acted upon and respond to some of the chrominance signal processing may degrade the luminance signal. The digital comb filter necessitates an analog-to-digital conversion or "digitization" of chrominance band video signals. In the event the chrominance signal is weak, that is lower in amplitude, the chrominance signal digitization does not utilize the full dynamic range of the analog-to-digital converter. Therefore, the signal to noise ratio of the digitized chrominance band signal is degraded. Therefore, it is important that the proper amplitude of the chrominance band signal be maintained at the input of the analog-to-digital converter. Regulation of the chrominance band signal at the input to the analog-to-digital converter is accomplished by making use of the reference color burst signal which is transmitted during the horizontal blanking interval following the horizontal scan synchronizing pulse. This reference burst is examined by a detector within the automatic chrominance control system and used to control a variable gain amplifier. Thus, if the reference burst decreases, the chrominance band signal gain is increased to compensate and maintain the required chrominance band signal. Conversely, if the reference burst increases, chrominance band signal gain is decreased.

This control of chrominance band signal in response to reference burst is appropriate because the chrominance signal level is related to the reference burst level. However, the luminance signal components are not related to the reference burst and thus changes of luminance signal in response to reference burst changes result in undesired distortion of the luminance signal.

There remains, therefore, a need in the art for a practical system which facilitates the use of digital electronic circuit processing to recover the luminance signal components from the chrominance band while avoiding degrading luminance signal distortion caused by chrominance system processing.

Accordingly, it is a general object of the present invention to provide an improved video processor. It is a more particular object of the present invention to provide an improved video processor which effectively separates the luminance and chrominance signal components within the chrominance signal band with faithful and accurate recovery of each signal component.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several FIGURES of which like reference numerals identify like elements and in which:

DESCRIPTION OF THE PREFERRED EMBODIMENTS

Figure 1:
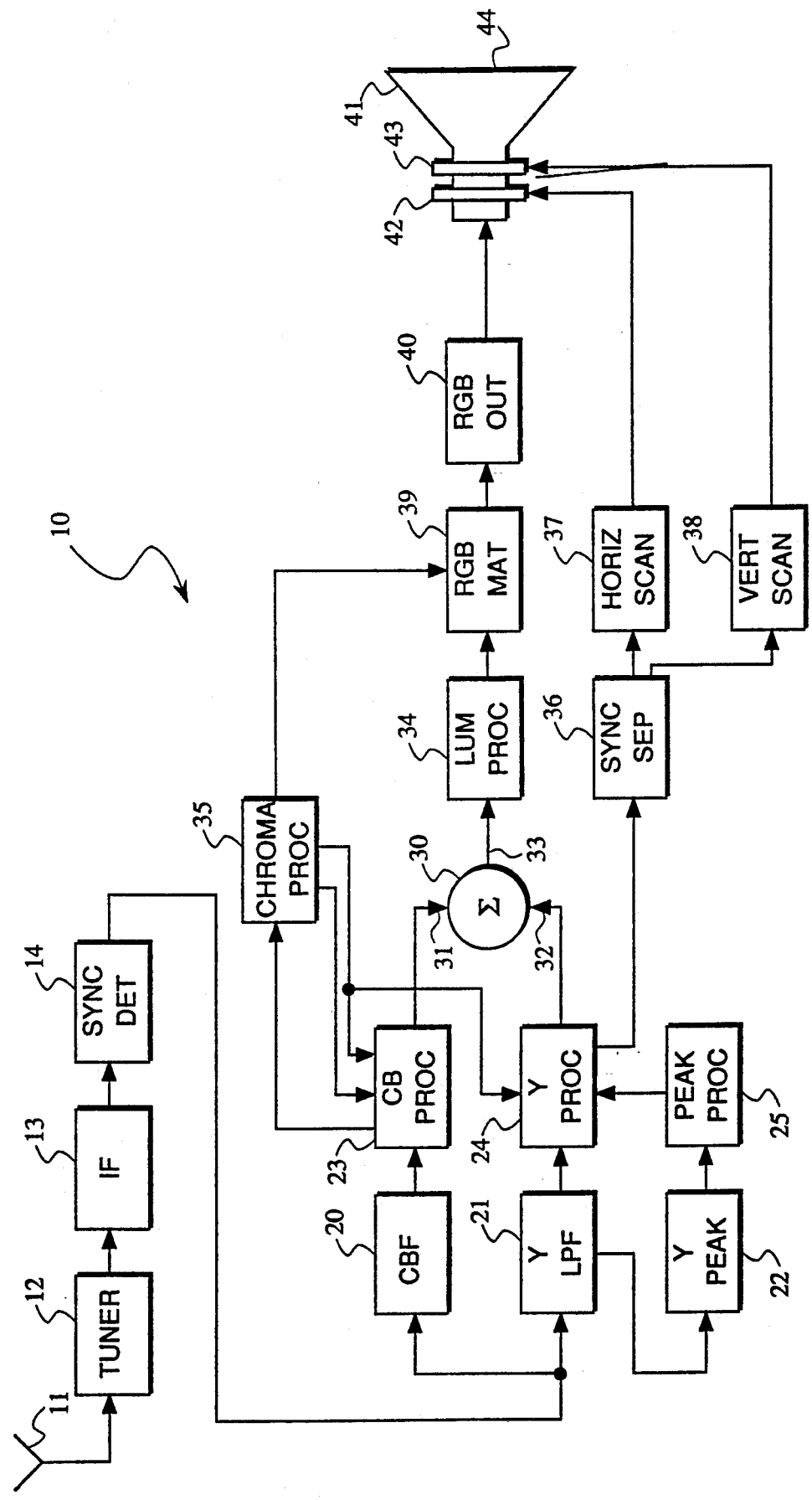
FIG. 1 sets forth a block diagram of a television receiver having a frequency multiplexed video processor constructed in accordance with the present invention.

FIG. 1 sets forth a block diagram of a television receiver constructed in accordance with the present invention and generally referenced by numeral 10. Receiver 10 includes an antenna 11 coupled to a tuner 12. The output of tuner 12 is coupled to an intermediate frequency amplifier 13 which in turn is coupled to a synchronous detector 14. The output of synchronous detector 14 is coupled to frequency selective filters 20 and 21. Filter 21 is further coupled to a filter 22. The output of filter 20 is coupled to a signal processor 23 while the outputs of filters 21 and 22 are coupled to respective signal processors 24 and 25. The output of signal processor 25 is coupled to signal processor 24. Signal processor 23 is coupled to a chrominance processor 35. A summing network 30 includes a pair of inputs 31 and 32 coupled to the outputs of processors 23 and 24 respectively. Summing network 30 further includes an output 33 coupled to the input of a luminance signal processor 34. The latter is coupled to a RGB matrix 39. The output of chrominance processor 35 is also coupled to RGB matrix 39. The output of RGB matrix 39 is coupled to an RGB output circuit 40.

A cathode ray tube 41, constructed in accordance with conventional fabrication techniques, includes a display screen 44 and is coupled to RGB output circuit 40. Cathode ray tube 41 further includes a horizontal deflection yoke 42 and a vertical deflection yoke 43.

Signal processor 24 includes an output coupled to a sync separator 36 which in turn is coupled to a horizontal scan system 37 and a vertical scan system 38. Horizontal scan system 37 is coupled to horizontal yoke 42 while vertical scan system 38 is coupled to vertical deflection yoke 43.

In operation, antenna 11, tuner 12, intermediate frequency amplifier 13 and synchronous detector 14 function in accordance with conventional television system practice to receive a transmitted television signal which is selected by tuner 12 and amplified by intermediate frequency amplifier 13 to a level sufficient to facilitate the operation of synchronous detector 14. The latter performs a synchronous detection process in which the composite video signal which includes the luminance and chrominance as well as the horizontal and vertical synchronizing signals is recovered from the intermediate frequency carrier at the input to synchronous detector 14.

Figure 2:
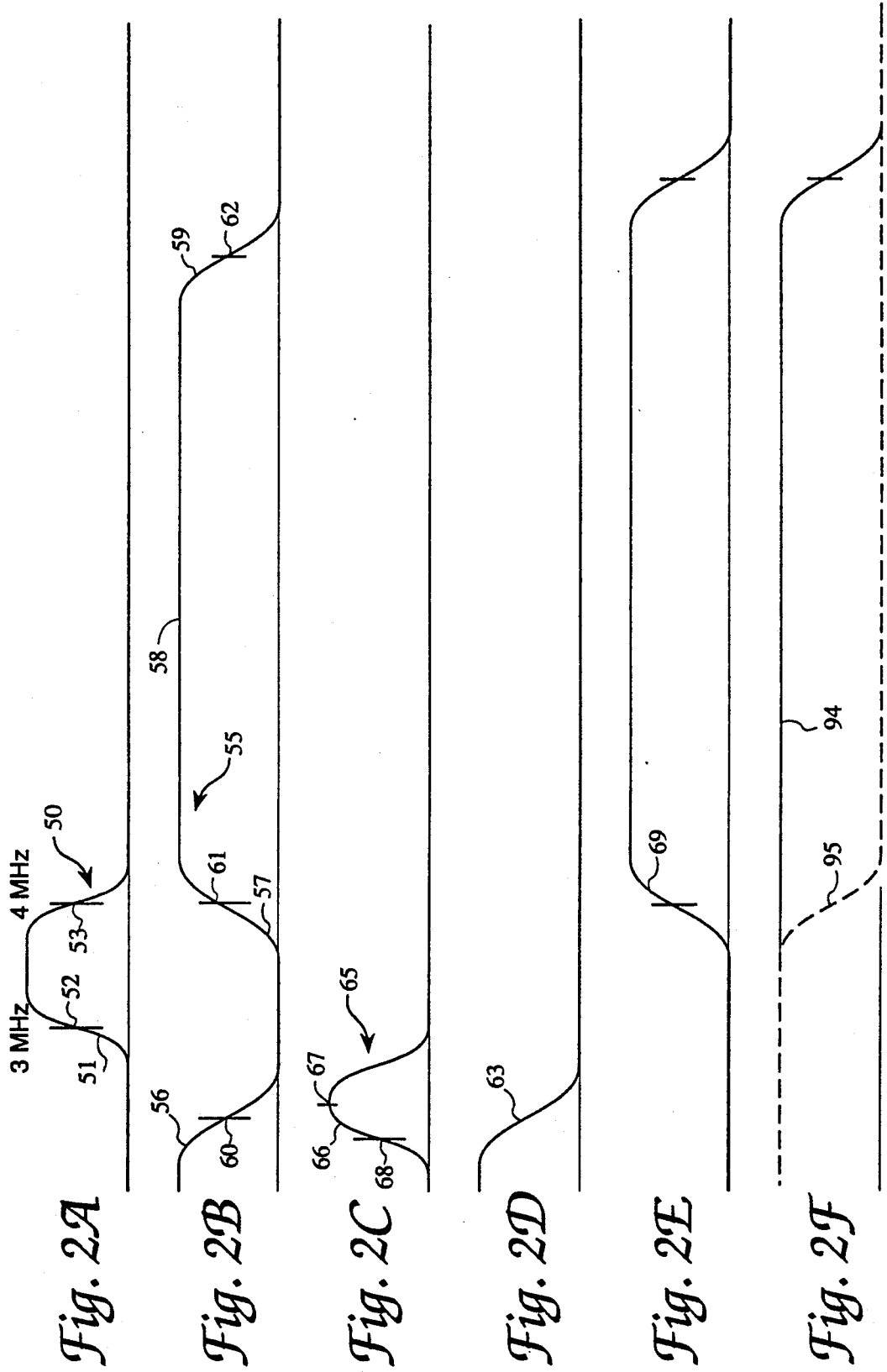
FIGS. 2A through 2F set forth frequency response curves of several portions of the present invention frequency multiplexed video processor.

The composite video signal recovered by synchronous detector 4 is applied to filters 20 and 21 and from the latter to filter 2. The frequency responses of filters 20 through 22 are set forth in FIG. 2. With temporary reference to FIGS. 1 and 2 together, FIG. 2A sets forth the response of filter 20 which, in essence, comprises a chrominance signal bandpass filter for an NTSC receiver generally referenced by numeral 50. Thus, frequency response curve 50 defines a passband 51 which is generally centered at the chrominance subcarrier frequency of 3.58 megahertz and which is approximately 1 megahertz wide at the 6db or "half points" 52 and 53. It will be apparent to those skilled in the art that filter 20 excludes all information within the composite video signal except for the portions thereof having frequencies within response curve 50. In a similar fashion, filter 21 defines a frequency response set forth in FIG. 2B and generally referenced by numeral 55. Response curve 55 defines extended regions 56 and 58 which are pass regions separated by a notch 57 therebetween. Notch 5 is generally coincident with the passband of curves 50 and 65. The 6db or half points 60 and 61 generally coincide with 6db points 68 and 53 of curves 67 and 50 in FIG. 2C and 2A respectively. The upper frequency region of response curve 55 defines a slope 59 having a 6db point 62 at approximately 10 megahertz. Thus, the response curve of filter 21 shown in FIG. 2B essentially passes all frequency components of the composite video signal with the exception of the chrominance bandpass and luminance peaking components. It should also be noted that frequency response 55 of filter 21 is configured to accommodate both NTSC and the newly emerging high definition video signal sources. Accordingly, when used in an NTSC broadcast environment, it will be apparent that very little, if any, luminance information will be contained in the extended frequency portion 58 of curve 55 beyond notch 57.

FIG. 2C sets forth the frequency response of filter 22 generally referenced by numeral 65. As can be seen, response curve 65 shows that filter 22 excludes all frequencies with the exception of a relatively narrow passband 66. Passband 66 is centered at a center frequency 67 which, in the present application, is selected to be 2.5 megahertz. The bandwidth and center frequency of bandpass 66 is, to some extent, a matter of design choice and, as is described below in greater detail, is selected to embrace the portion of the luminance signal which benefits the most from luminance or video peaking processes. It has been found advantageous in the present system to utilize a bandwidth of approximately one-half megahertz for bandpass 66.

Returning to FIG. 1, the filtered output signals of filters 20, 21 and 22 are coupled to a corresponding trio of signal processors 23, 24 and 25 respectively. The operations of processors 23, 24 and 25 are set forth below in greater detail. However, suffice it to note here that processor 23 receives both chrominance and luminance signals within the 3 to 4 megahertz frequency bandwidth and as a result includes the color burst and chrominance signals together with 3 to 4 megahertz frequency luminance information. As is also set forth below in greater detail, processor 23 is operative upon the applied signal to perform a separation of the chrominance information from the luminance information and to perform the automatic chromacontrol, or ACC, function intended to maintain the desired amplitude for the chrominance signal components. The chrominance signal is applied to chrominance processor 35. Concurrently, the luminance signal components are processed within processor 23 and are separated from the chrominance signal components and processed in accordance with the present invention. The luminance signals are then coupled to a summing network 30 at input 31. As will be also be described below in greater detail, the operation of processor 23 utilizes advantageous digital processing techniques such as digital comb filtering to efficiently separate the chrominance information from the high frequency luminance information in the 3 to 4 megahertz band which in many prior art television receivers is lost.

Processor 24 essentially processes all of the luminance information with the exception of signal components within the chrominance bandwidth processed by processor 23. Accordingly, processor 24 may be thought of as the primary or main luminance signal processor. As is described below in greater detail, processor 24 performs the important functions of providing a video clamping level and utilizes digital circuitry to provide a precise luminance delay network to match the time delay of the luminance signals from processor 23, prior to addition by summing network 30. The output of processor 24 which includes luminance information having frequencies from 0 to 3 megahertz and from 4 to 11 megahertz and which is free of any chrominance information is coupled to input 32 of summing network 30.

Processor 25 is configured to provide supplemental luminance signal processing and is intended to provide the desired luminance signal peaking. The operation of processor 25, therefore, is extremely important to the overall quality and appeal of the displayed image of receiver 10. As is known, the use of luminance signal peaking techniques in which the luminance signal components at significant transition points are emphasized enhances the displayed image. Essentially, the operations of peaking systems provide emphasized preshoot and overshoot components adjacent the luminance signal transitions to sharpen the displayed image and provide a "crisper" display. Processor 25 performs this function in the manner set forth below by separately amplifying the luminance signal components used in luminance peaking. This enhanced peaking signal is coupled to processor 24 and, in the manner set forth below in greater detail, is combined with the luminance signal processed thereby.

Summing network 30 combines the luminance information from processors 23 and 24 to provide a full spectrum luminance signal at output 33 which is applied to luminance processor 34. It should be noted that in accordance with an important aspect of the present invention described below in greater detail, the frequency multiplexing of the present invention system provides for complete recovery of the entire spectrum of luminance frequencies while nonetheless efficiently separating the chrominance signal. Luminance processor 34 provides further amplification and processing of the luminance signal for application to RGB matrix 39.

Similarly, chrominance processor 35 is operative in accordance with conventional receiver techniques to recover the color difference signals from the chrominance input from processor 23. The output color difference signals from processor 35 are also applied to RGB matrix 39. Matrix 39 is constructed in accordance with conventional fabrication techniques and, in essence, combines the color difference signals from chrominance processor 35 with the luminance signal from processor 34 to produce RGB color video signals which are amplified by output amplifier 40 and applied to cathode ray tube 41 in further accordance with conventional processing techniques.

Sync separator 36 receives a luminance signal output from processor 24 and separates the horizontal and vertical scan synchronizing signals therefrom which are used to synchronize the operations of horizontal and vertical scan systems 37 and 38 and provide energizing signals for horizontal and vertical yokes 42 and 43 respectively.

Figure 3:
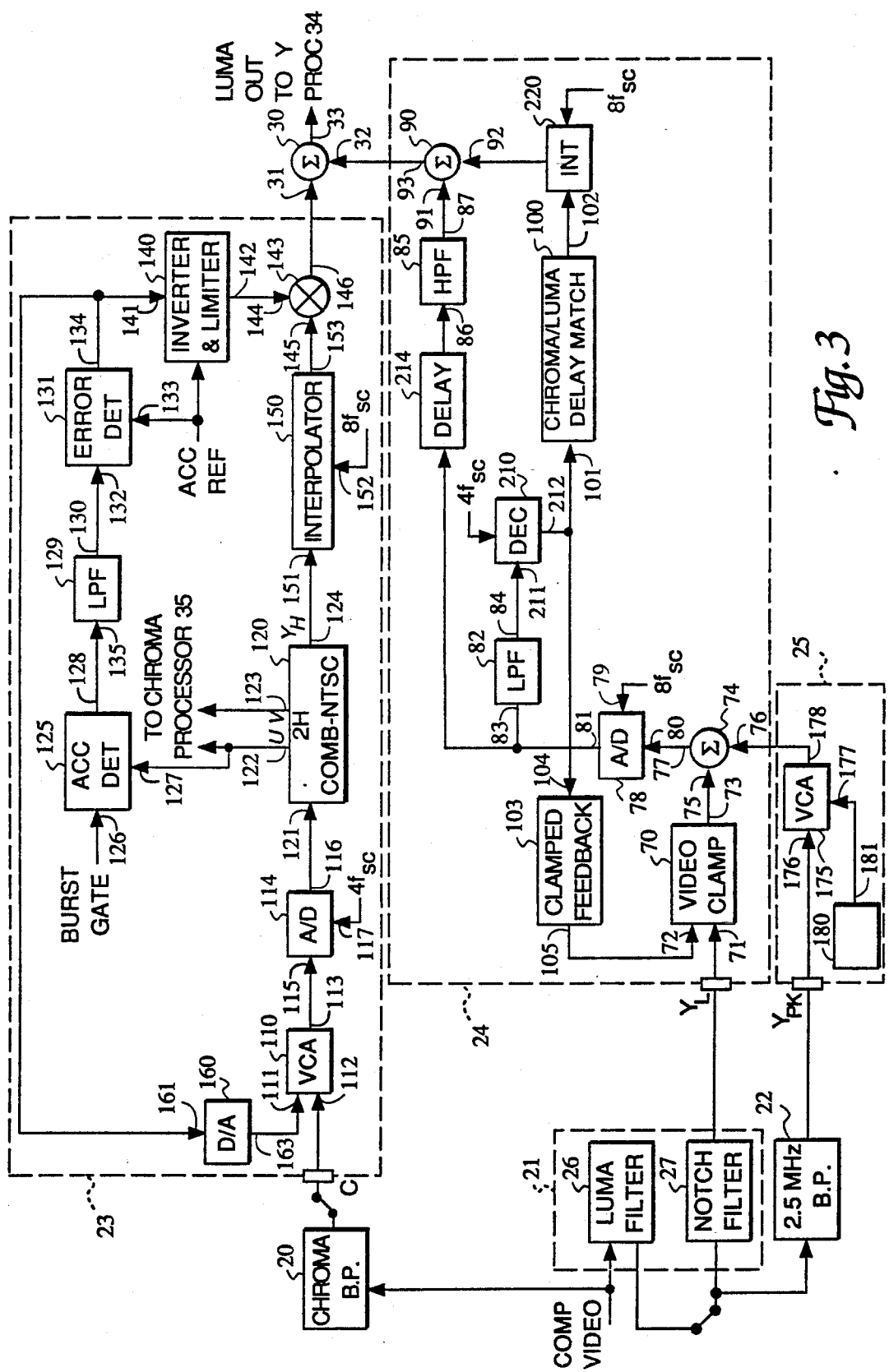
FIG. 3 sets forth a block diagram of the present invention frequency multiplexed video processor.

FIG. 3 sets forth a detailed block diagram of processors 23, 24 and 25 constructed in accordance with the present invention. Also shown in FIG. 3 are input filters 20, 21 and 22. As mentioned above in FIG. 1, the composite video output signal from synchronous detector 14 which includes luminance, chrominance and synchronizing information signals is applied commonly to filters 20 and 21. Filter 21 includes two filter stages 26 and 2 serially coupled between synchronous detector 14 (shown in FIG. 1) and processor 24 and defines the abovementioned frequency response shown in FIG. 2B which generally excludes chrominance and luminance peaking information. The output of luminance filter 26 is substantially free of chrominance information and is coupled to a notch filter 27 and filter 22. Notch filter 27 defines a complimentary response to bandpass filter 22.

Processor 24 includes a video clamp circuit 70 having an input 71 coupled to notch filter 27, an input 72, and an output 73. The latter is coupled to an input 75 of a summing network 74. An analog-to-digital converter 78 includes an 8fsc clock signal input 79, an input 80 coupled to output 77 of summer 74 and an output 81. A highpass filter 85, having a frequency response set forth in FIG. 2E, includes an input 86 coupled to output 81 of analog-to-digital converter 78 and an output 87 coupled to input 91 of a summing network 90. A low pass filter 2 having a frequency response corresponding to response curve 63 in FIG. 2D includes an input 83 coupled to output 81 of analog-to-digital converter 78 and an output 84. A clamp feedback circuit 103 includes an input 104 coupled to output 84 of low pass filter 82 and an output 105 coupled to input 72 of video clamp 70. A delay line network 100 includes an input 101 coupled to output 84 of low pass filter 82 and an output 102 coupled to input 92 of summing network 90. The summing network 90 includes an output 93 coupled to input 32 of summing network 30. Delay line 100 provides a delay equal to the required chrominance/luminance time difference plus a one horizontal line delay. The latter is needed to compensate for the one horizontal line delay introduced into the signals processed by the two horizontal line network of comb 120.

Processor 23 includes a gain controlled amplifier 110 having an input 112 coupled to filter 20, a control signal input 111, and an output 113. An analog-to-digital converter 114 includes an input 115 coupled to output 113 of amplifier 110, a clock signal input 117 coupled to a clock signal source having a frequency four times the chrominance subcarrier or "4fsc" (not shown) and an output 116. A two horizontal line NTSC comb filter 120 includes an input 121 coupled to output 116 of analog to digital converter 114, a pair of chrominance signal outputs 122 and 123, and a luminance signal output 124. A digital interpolator 150 includes an input 151 coupled to luminance output 124 of comb filter 120, a clock signal input 152 coupled to a clock signal source having a frequency eight times the chrominance subcarrier or "8fsc" (not shown), and an output 153. The latter is coupled to an input 145 of a multiplier network 143. Multiplier network 143 further includes an input 144 and an output 146 with the latter being coupled to input 31 of summing network 30. An automatic chrominance control detector 125 includes an input 126 coupled to a source of burst gating pulse (not shown), an input 127 coupled to output 122 of comb filter 120, and an output 128. A low pass filter 129 includes an input 135 coupled to output 128 of detector 125 and an output 130. An error detector 131 includes an input 132 coupled to output 130 of filter 129, a reference input 133 coupled to a source of ACC reference potential (not shown), and an output 134. An inverter and limiting circuit 140 includes a reference input coupled to the same source of ACC reference potential which controls error detector 131, an inverter and limiting circuit 140 also includes an input 141 coupled to output 134 and an output 142 coupled to input 144 of summing network 143. A digital-to-analog converter 160 includes an input 161 coupled to output 134 of error detector 131 and an output 163 coupled to control input 111 of gain controlled amplifier 110.

A gain controlled amplifier 175 includes an input 176 coupled to filter 22, a gain control input 177, and an output 178 coupled to input 76 of summing network 74. A source of gain control voltage 180 includes an output 181 coupled to gain control input 177 of gain controlled amplifier 175.

In operation and by way of overview, the circuit of FIG. 3 provides frequency multiplexed luminance and chrominance processing in which processor 24 may be regarded as the primary luminance signal processor. Processor 23 processes the chrominance portion of the applied composite video signal together with the luminance signal components found within the frequency bandwidth of the chrominance signal. Finally, processor 25 is dedicated to the separate processing of the luminance signal components which correspond to luminance transition peaking.

With respect to the operation of processor 24, it should be recalled that th composite video signal applied to filter 21 is subjected to the frequency response of filter 21 which includes filter sections 26 and 27. As a result, the signal applied to clamp circuit 70 has a frequency characteristic shown in Figure 2B as curve 55 which may be generally characterized as the luminance signal frequencies above and below the chrominance bandpass frequency together with the scan synchronizing signals. Notch filter 27 provides attenuation of signal components at 2.5 megahertz. Since the signal at input 71 does not contain chroma signal, therefore, the burst signal is removed from the blanking pulse which permits video clamp 70 to operate in a more efficient 10 manner in establishing the appropriate reference level for the luminance signal. The clamping level is established by a digitally encoded reference signal provided by clamped feedback circuit 103 and applied to input 72 of clamp 70. Thus, in response to the applied digitally encoded reference signal, the DC level of the blanking signal within the scan retrace interval is established within clamp 70. Concurrently, blanking pulse clamping establishes the appropriate DC component of the luminance signal.

Filter 22 couples the luminance peaking signal components from the output of filter 26 to gain controlled amplifier 175 where it is amplified in accordance with a gain control voltage provided by peaking control 180. Control 180, in its simplest form, may comprise a consumer adjustable DC control which establishes the desired peaking signal amplitude and "sharpness" of the displayed image. The clamped luminance signal from clamp 70 is combined with the enhanced peaking signal from amplifier 175 by summing network 74 and converted from an analog signal to a digitally encoded signal by converter 78. To maintain the maximum amount of the all-important high frequency luminance signal components within the converted signal, analog-to-digital converter 78 is operated in response to a clock signal input having a relatively high frequency. While the frequency of clock signal used is, to some extent, a matter of design choice, it has been found convenient in the present system to utilize a clock signal having a frequency eight times that of the chrominance subcarrier. The digital signal produced by converter 78 is filtered by a digital low pass filter 82 having a frequency response corresponding generally to response curve 63 in Figure 2D. The low frequency signal components passed by filter 82 are applied to a decimator in which the digital signal data rate is down converted from 8fsc to 4fsc afterwhich it is coupled to clamp feedback circuit 103 which processes the digitally encoded low frequency luminance signals to provide a DC feedback input for clamp 70. Because of the conversion to a digitally encoded signal provided by converter 78, delay matching network 100 may be correspondingly constructed using digital circuit techniques. The data rate reduction o the digital luminance signal produced by decimator 210 facilitates a considerable reduction in this size of delay matching network 100. The delay of the wider bandwidth luminance signal is required in receivers such as receiver to compensate for the delays associated with the narrow band processing of the chrominance signal and the luminance signal (3 to 4 megahertz), and for the delays in the comb filter and the interpolator. As mentioned above, comb filter 120 is in its preferred form, a two horizontal line comb. While this improves its performance, the two line structure introduces a horizontal line delay which must be compensated within the remainder of the luminance processor. Accordingly, the delay provided by delay network 100 includes this additional horizontal line delay. The digital processing within delay network 100 facilitates the provision of such delays and ensures precise coincidence of the luminance and chrominance signals in the displayed image and enhances overall image quality.

The delayed luminance signal is combined with the remainder of the luminance signal filtered by highpass filter 85, and delayed by delay match 214, within summing network 90. Highpass filter 85 defines a frequency characteristic corresponding to response curve 69 in FIG. 2E and is operative to exclude the low frequency video components selected by low pass filter 82. This exclusion of lower frequency luminance components is necessary to ensure that all low frequency luminance signal components are subjected to the delay within delay network 100. The separation of low frequency and high frequency signal paths facilitates the use of a considerably reduced size delay network because the lower frequency luminance signal can be down converted to a slower data rate of 4fsc by decimator 210 before processing by delay 100 and thereafter up converted by interpolator 220 back to an 8fsc data rate prior to application to summing network 90. In addition, it should be noted that the input signals to summing network 90 are digitally encoded signals. Thus, summing network 90 should be understood to include a conventional digital signal adder. The digitally encoded combined signal at the output of summing network 90 is applied to summing network 30 which also comprises a digital signal adder. Thus, processor 24 provides the all important luminance processing operations of proper video clamping together with the imposition of a precise luminance signal delay while maintaining the frequency response shown in FIG. 2B. As a result, the output signal of processor 24 maintains all of the luminance signal components of the input signal within the response shown in FIG. 2B and further includes the enhanced or emphasized luminance peaking signals provided by processor 25. In essence, then, the output signal of processor 24 includes all luminance signals but for those falling within the chrominance signal bandwidth. One important function of processor 23 is to provide the remaining luminance components to complete the luminance signal and provide a full spectrum response.

Turning now to the operation of processor 23, it should be recalled that the input signal to processor 23 comprises the composite video signal from synchronous detector 14 filtered by bandpass filter 20 in accordance with the frequency response shown in FIG. 2A. Thus, the input signal to gain controlled amplifier 110 includes both the chrominance and luminance signal information falling within the bandpass shown in FIG. 2A. As is described below in greater detail, gain controlled amplifier 110 provides a variable signal gain which, forms a portion of the automatic chrominance control used to maintain a constant chrominance band signal output level for processor 23. However, because gain controlled amplifier 110 amplifies both the applied luminance and chrominance signals and thus, but for the operation of inverter and limiter 140 together with multiplier 143, the luminance signals within processor 23 would be inappropriately affected by ACC action. The output of gain controlled amplifier 110 is coupled to analog-to-digital converter 114. The signal applied to converter 114 does not include the higher frequency signal components which are applied to converter 78 within processor 24. As a result, a lower frequency clock signal may be utilized which permits the use of a considerably smaller two horizontal line network for comb filter 120. Accordingly, it has been found convenient to utilize a clock signal input to converter 114 having a frequency four times the chrominance subcarrier frequency. Converter 114 operates in accordance with conventional processes to convert the applied analog signal to a corresponding digitally encoded signal which is applied to comb filter 120. It should be recalled that the digitally encoded signal at the output of converter 114 includes both chrominance and luminance signals within the bandpass response of filter 20.

Comb filter 120 comprises a digital comb filter which is extremely efficient at separating the luminance and chrominance information from the applied input without sacrificing the important luminance components. As a result, substantial advantage in the efficiency and effectiveness of the present invention system is achieved by the use of digitally encoded signal processing within processor 23. The separated chrominance signal components are coupled to chrominance processor 35 as described above.

It should be noted that while considerable reduction of complexity and economy is realized due to the use of a slower sampling rate in analog-to-digital converter 114 which in turn facilitates the use of a smaller two horizontal line comb network. However, because the resulting luminance signal at output 124 of comb filter 120 is a digitally encoded signal having a lower clock rate than that used in processor 24, the combination of the lower clock rate luminance signal output of comb filter 120 with the higher clock rate luminance signal provided by processor 24, requires the use of interpolator 150 interposed between the luminance signal output of comb filter 120 and summing network 30. Thus, interpolator 150 is operative in response to the same clock signal input utilized by analog-to-digital converter 78 within processor 24. Interpolator 150 functions in accordance with conventional fabrication techniques to convert the slower clock signal output of comb filter 120 to the higher clock signal rate or data rate of the applied clock signal at input 152 thereof. The use of lower frequency converter 114 and interpolator 150 achieves an overall economic advantage in that the two horizontal line memory comb filter 120 will require half as much memory than if the clock rate was twice as fast, because with faster sample rate, the number of video samples in the horizontal line will be higher.

The chrominance output signal of comb filter 120 is further processed by a conventional automatic chrominance control, or ACC, loop formed by ACC detector 125, low pass filter 129 and error detector 131. In accordance with conventional processing techniques, the burst gate pulse applied to detector 125 permits the separation of the reference chrominance signal burst from the remainder of the signal which is then amplitude detected by detector 125 and averaged by low pass filter 129 and compared to a predetermined reference number by detector 131. The output of detector 131 is a digitally encoded amplitude correction signal which is fed back to voltage controlled amplifier 110 through a digital-to-analog converter 160. The use of digital-to-analog converter 160 is required because voltage controlled amplifier 110 is an analog device which responds to an input analog control signal. The resulting operation of the control loop thus formed maintains a substantially constant chrominance signal output level for use by chrominance processor 35.

As a consequence of the operation of the automatic chrominance control or ACC loop within processor 23, a corresponding color burst signal dependent amplitude characteristic is imposed upon the luminance signal components which are concurrently amplified by gain controlled amplifier 110. It has been found desirable not to increase the amplitude of the luminance components of the video information in the range of three to four megahertz. Therefore, any increase of these luminance components due to automatic chrominance control action in response to chrominance reference burst decreases is compensated for by the action of multiplier 143. This compensation is accomplished by inverting the chrominance correction signal and applying it to multiplier 143 at input 144. The luminance signal at the output of multiplier 143 is reduced by this inverted correction signal which compensates for the increase caused by the automatic chrominance control amplifier (VCA 110). As a result, luminance signals within the three to four megahertz range are processed using most of the dynamic range of analog-to-digital converter 114 while remaining unaffected by the action of the automatic chrominance control system. The negative going chrominance control signal is limited by inverter and limiter 140. As a result, gain reductions implemented by VCA 110 within the automatic chrominance control system which cause reductions of the luminance signal are not compensated for by multiplier 143 since such reductions are not visibly degrading to the displayed luminance signal. The luminance signal output from multiplier 143 is applied network 30. Summing network 30 is also a digital adder combining the luminance signal outputs of processors 23 and 24 to provide a full spectrum luminance signal output which is coupled to luminance processor 34 (seen in FIG. 1).

It will be apparent to those skilled in the art that the present invention system shown in FIG. 3 provides substantial advantages over the prior art systems. The use of frequency multiplexing between processors 23, 24 and 25 permits individual attention to each component of the luminance and chrominance signal frequency spectra and minimizes the loss of information within the system. The use of digital signal processing within the present invention system achieves substantial economy of operation as well as improved performance. In addition, the additional frequency multiplexing within processor 24 between low frequency luminance and high frequency luminance components permits the use of an extremely efficient and effective digital delay line without sacrificing high frequency signal response. Also, the frequency separation of luminance peaking components for individual processing by processor 25 permits precise control of luminance peaking without interference or interaction of peaking signals with the remainder of the luminance signal processing. The resulting combined luminance signal applied to luminance processor 34 is shown in FIG. 2F as response curve 94. With temporary reference to FIG. 2F, it should also be noted that dashed line curve 95 represents the effective overall response of the present invention system to an applied NTSC composite video signal. The difference between response curve 95 and the overall response curve of the system 94 is the result of frequency limitations within the NTSC broadcast standard itself and not the present invention system. Thus, in accordance with an important advantage, the present invention system is fully capable of providing the full spectrum response required by newly emerging sources of high resolution television signals.

Figure 4:
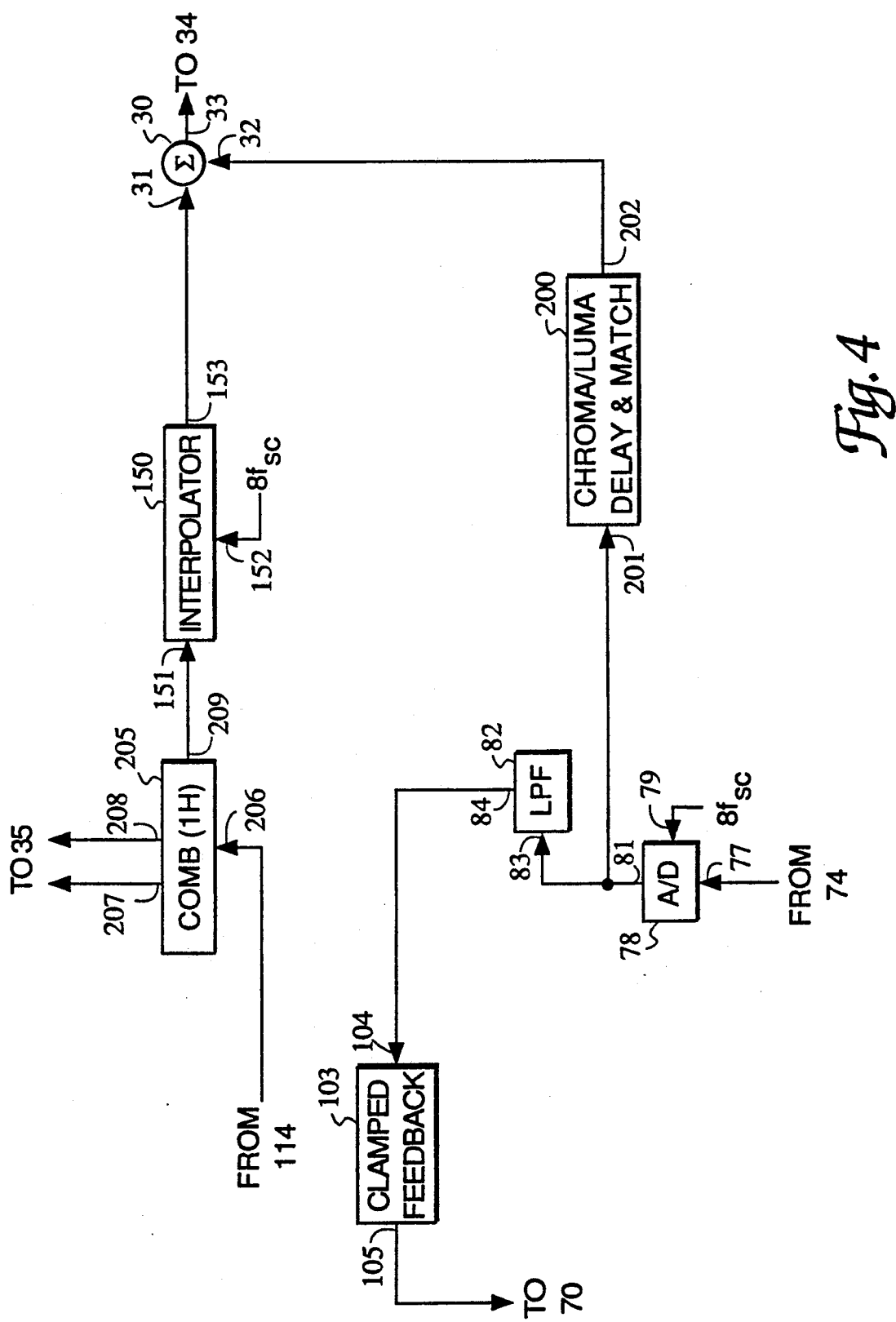
FIG. 4 sets forth a block diagram of an alternate embodiment of the present invention frequency multiplexed video processor.

FIG. 4 sets forth an alternate embodiment of the present invention which is generally the same as the embodiment shown in FIG. 3 with the exception of the use of a smaller comb filter 205 in place of comb filter 120 in the embodiment of FIG. 3. In addition, the embodiment shown in FIG. 4 utilizes a correspondingly smaller delay network 200 in place of delay network 100 which has a horizontal scan line delay in addition to the delay required to match the chrominance signal to the luminance signal and eliminates bandpass filter 85 and summing network 90. The remainder of the embodiment shown in FIG. 4 is identical to the embodiment shown in FIG. 3.

Specifically, analog-to-digital converter 78 includes an input 77 coupled to summing network 74, a clock input 79 and an output 81. Low pass filter 82 includes an input 83 coupled to converter 78 and an output 84 coupled to input 104 of clamp feedback circuit 103. The output of converter 78 is further coupled to an input 201 of a delay network 200. Delay network 200 includes an output 202 coupled directly to input 32 of summing network 30. A one horizontal line comb filter 205 includes an input 206 coupled to analog-to-digital converter 114 (seen in FIG. 3). Comb filter 205 further includes chrominance outputs 207 and 208 coupled to chrominance processor 35 (seen in FIG. 1) and a luminance output 209 coupled to input 151 of interpolator 150. The output of interpolator 150 is coupled to 10 input 31 of summing network 30 in the same manner as set forth in FIG. 3. In further accordance with the embodiment of FIG. 3, the output of summing network 30 is coupled to luminance processor 34 (shown in FIG. 1).

The embodiment of FIG. 4 is configured to facilitate the use of a smaller comb filter 205 having a size corresponding to one horizontal line of information. Accordingly, the one horizontal line structure of comb filter 205 does not introduce the additional horizontal line delay experienced by the two horizontal line comb structure of comb 120 used in the embodiment of FIG. 3. Accordingly, delay network 200 is not required to provide a compensating horizontal line delay and thus comprises a substantially smaller delay network having sufficient delay to provide the required chrominance/luminance time delay. As a result, the luminance output signal from converter 78 need not be separately filtered in the manner provided by filters 82 and 85 in the embodiment of FIG. 3 but may instead be applied directly to input 201 of delay network 200. With the elimination of separate processing through filters 82 and 85 in the manner shown in the embodiment in FIG. 3, the embodiment of FIG. 4 no longer requires summing network 90 and thus the output of delay network 200 may be applied directly to summing network 30. Low pass filter 82 is maintained in the feedback path from converter 78 to clamped feedback network 103 to maintain the desired frequency response of the video clamping network. This embodiment also does not require decimator 210 and interpolator 220 shown in FIG. 3.

Thus, it will be apparent from the examination of FIG. 4 that substantial economy has been obtained in comparison to the embodiment of FIG. 3 by the use of a smaller comb filter, a smaller delay network and the elimination of highpass filter 85, decimator 210, interpolator 220 and summing network 90. Despite the reduced cost of the embodiment shown in FIG. 4 with respect to the embodiment of FIG. 3, however, many of the performance advantages of the present invention system are retained including the frequency multiplexing which provides the individual processing of the luminance signal within the chrominance band, the luminance peaking frequencies, and the extended luminance frequencies processed by processor 24. Thus, the embodiment of FIG. 4, in essence, practices the present invention in a lower cost manner.

Figure 5:
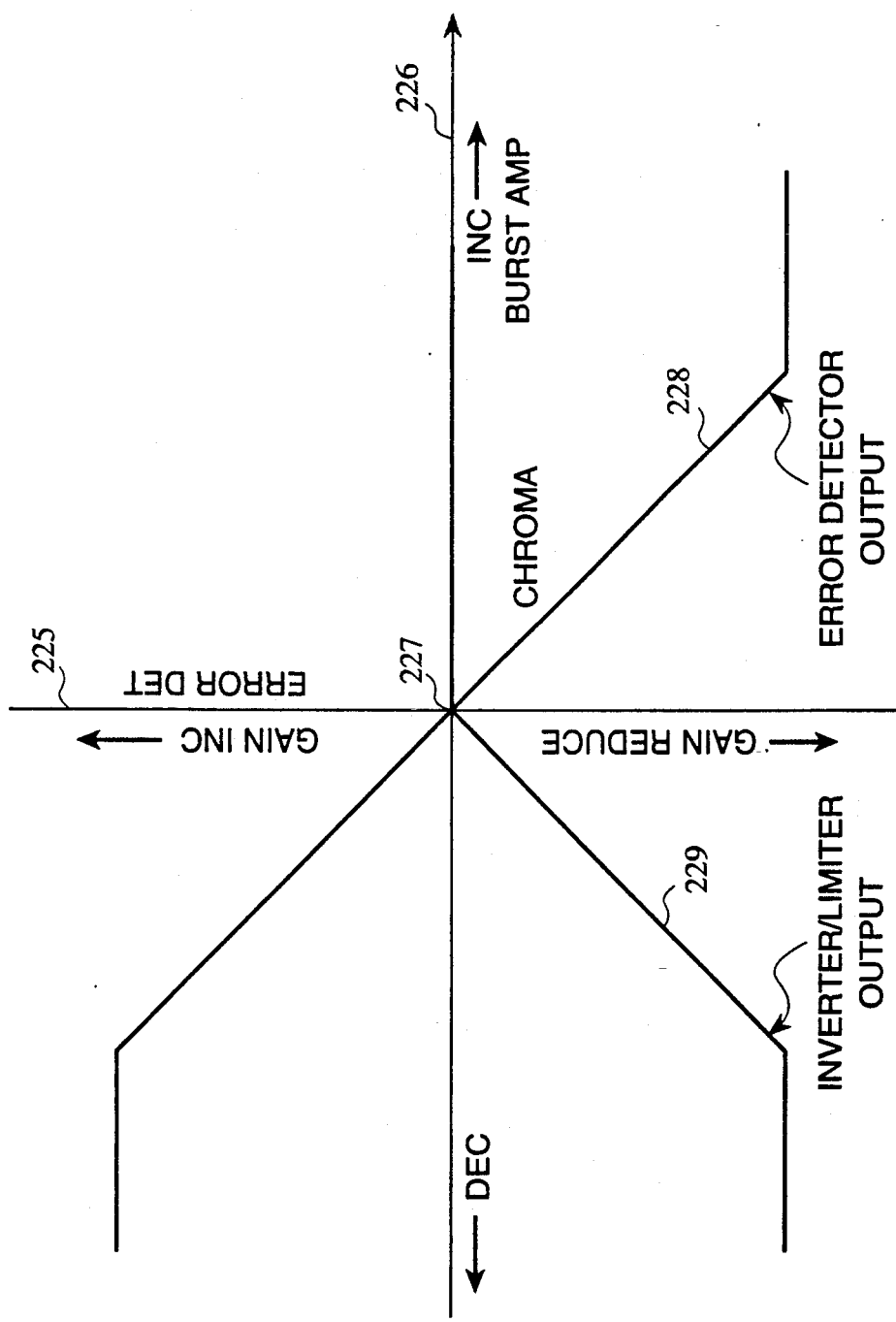
FIG. 5 is a graph depicting the relationship between the chrominance burst amplitude and the error detector output and the inverter/limiter output.

FIG. 5 sets forth the response curve of the present invention automatic chrominance control compensation. Specifically, FIG. 5 sets forth a vertical axis 225 which indicates chrominance gain changes and a horizontal axis 226 which indicates chrominance burst signal amplitude. Axes 225 and 226 intersect at origin 227. Curve 228 sets forth the output of error detector 131 (See FIG. 3) while curve 229 sets forth the output of inverter/limiter 140 (see FIG. 3). It is important to note that the output of inverter/limiter 140 does not respond to increases of burst signal amplitude.

What has been shown is a cost effective, efficient and high performance digital video processor for use in a television receiver, computer monitor or other similar processing system. The system utilizes a combination of frequency multiplexing together with sophisticated and cost effective digital electronic circuit processing techniques to provide a high performance processor at a cost effective price. The luminance signals within the chrominance band are effectively processed and recovered from the chrominance band signal without undesired interaction with the chrominance processing.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in an image display system responsive to a composite video signal having chrominance information within a chrominance frequency band, a chrominance reference signal and luminance information, a video processing means comprising:

means for receiving said composite video signal;

means for frequency dividing said composite video signal into a chrominance band signal having said chrominance information and a chrominance band portion of said luminance information therein and a luminance signal having a nonchrominance band portion of said luminance information;

means for processing said chrominance band signal to maintain a signal amplitude related to said chrominance reference signal; wherein said means for processing said chrominance band signal includes means for developing an error signal and wherein said means for producing a compensating change includes;

means for inverting said error signal to produce an inverted error signal; and means for controlling the amplitude of said separated chrominance band portion of said luminance information in response to said inverted error signal;

means for separating said chrominance band portion of said luminance information within said chrominance band from said chrominance information; and means for producing a compensating change in said chrominance band portion of said luminance information within said chrominance band generally opposite changes produced therein by said means for processing.

2. Video processing means as set forth in claim 1 wherein said means for processing includes means for establishing a chrominance information amplitude reference and a corresponding nominal chrominance information amplitude.

3. Video processing means as set forth in claim 2 wherein said means for controlling includes means for limiting said inverted error signal to be generally constant for error signal changes corresponding to increases of said chrominance information amplitude reference beyond a predetermined level.

4. Video processing means as set forth in claim 3 wherein said predetermined level corresponds to said nominal chrominance information amplitude.

5. For use in an image display system responsive to a composite video signal having chrominance information within a chrominance frequency band, a chrominance reference signal and luminance information, a video processing method comprising the steps of:

receiving said composite video signal;

frequency dividing said composite video signal into a chrominance band signal having said chrominance information and a chrominance band portion of said luminance information therein and a luminance signal having a nonchrominance band portion of said luminance information;

processing said chrominance band signal to maintain a signal amplitude related to said chrominance reference signal; wherein said step of processing said chrominance band signal includes developing an error signal and wherein said step of producing a compensating change includes:

inverting said error signal to produce an inverted error signal; and controlling the amplitude of said separate chrominance band portion of said luminance information in response to said inverted error signal;

separating said chrominance band portion of said luminance information within said chrominance band from said chrominance information; and producing a compensating change in said chrominance band portion of said luminance information within said chrominance band generally opposite changes produced therein during said processing step.

6. A video processing method as set forth in claim 5 wherein said processing step includes establishing a chrominance information amplitude reference and a corresponding nominal chrominance information amplitude.

7. A video processing method as set forth in claim 6 wherein said controlling step includes the step of limiting said inverted error signal to be generally constant for error signal changes corresponding to increases of said chrominance information amplitude reference beyond a predetermined level.

8. A video processing method as set forth in claim 7 wherein said predetermined level corresponds to said nominal chrominance information amplitude.

9. For use in a television receiver responsive to a composite video signal having chrominance information within a chrominance frequency band, a chrominance reference burst signal and luminance information, a video processor comprising:

means for receiving said composite video signal;

means for separating said chrominance information, said chrominance reference burst signal and the portion of said luminance information within said chrominance frequency band from the remainder of said composite video signal to form a chrominance band signal;

an automatic chrominance control coupled to said means for separating detecting the amplitude of said chrominance reference burst signal and amplifying said chrominance reference burst signal and amplifying said chrominance band signal to maintain a substantially constant reference burst amplitude;

a comb filter coupled to said automatic chrominance control separating said portion of said luminance information within said chrominance frequency band from said chrominance information;

an automatic chrominance control coupled to said means for separating detecting the amplitude of said chrominance reference burst signal and amplifying said chrominance band signal to maintain a substantially constant reference burst amplitude;

a comb filter coupled to said automatic chrominance control separating said portion of said luminance information within said chrominance frequency band from said chrominance information;

an automatic chrominance control compensator coupled to said automatic chrominance control and said comb filter imposing a variable gain upon said portion of said luminance information within said chrominance frequency band which tends to compensate for changes thereof caused by said automatic chrominance control.

10. A video processor as set forth in claim 9 wherein said automatic chrominance control includes a detector producing a burst signal related error signal and wherein said automatic chrominance control compensator includes:

a multiplier having a control input and a signal input coupled to said control input of said multiplier.

11. A video processor as set forth in claim 10 wherein said inverter defines a nonlinear output characteristic.

* * * * *